(No Model.)
W. ARNOLD.
INSERTIBLE SAW TOOTH.
No. 303,787. Patented Aug. 19, 1884.
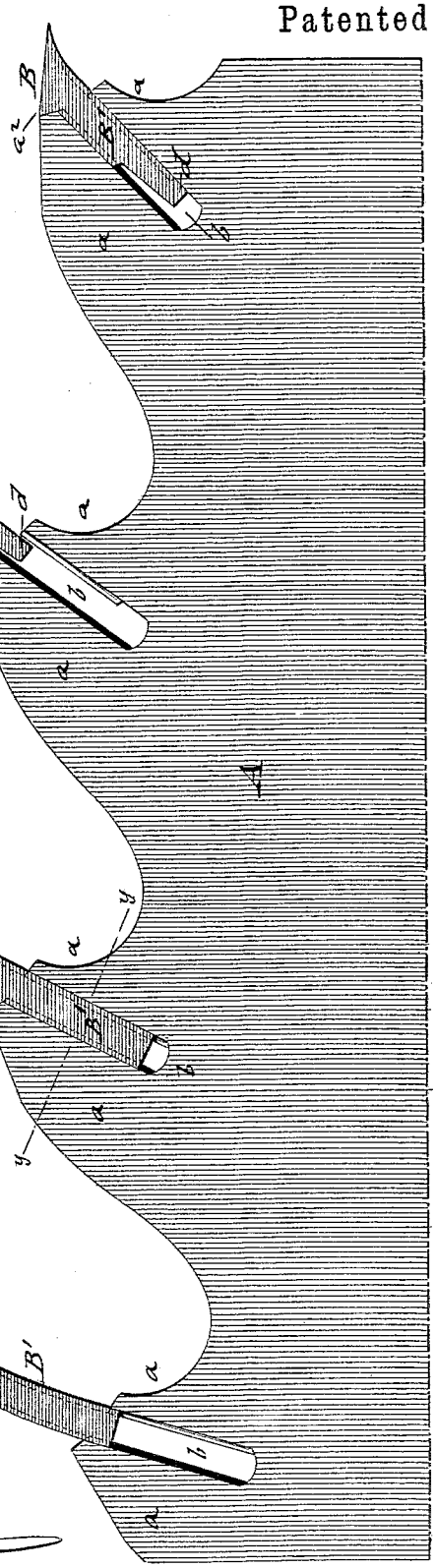
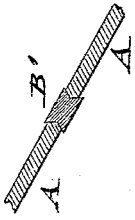
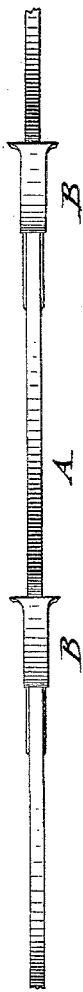
WITNESSES:
INVENTOR
Wilhelm Arnold
BY
ATTORNEYS.

UNITED STATES PATENT OFFICE.

WILHELM ARNOLD, OF NEW YORK, N. Y.

INSERTIBLE SAW-TOOTH.

SPECIFICATION forming part of Letters Patent No. 303,787, dated August 19, 1884.

Application filed January 24, 1884. (No model.)

*To all whom it may concern:*

Be it known that I, WILHELM ARNOLD, of the city, county, and State of New York, have invented certain new and useful Improvements in Saws with Insertible Teeth, of which the following is a specification.

This invention has reference to an improved saw with insertible teeth; and it consists of a saw-blade the abutments of which have straight recesses with tapering edges, and of insertible teeth the shanks of which are slightly curved and grooved at the edges, so as to fit the beveled edges of the saw-recesses. The shanks of the insertible teeth are reduced in width at their inner ends, and provided with a heel that takes against the end of the beveled edge of the recess, whereby the tooth is rigidly locked into the recess.

In the accompanying drawings, Figure 1 represents a side elevation of my improved saw, showing the insertible teeth in position before and after insertion into the recesses of the saw-blade. Fig. 2 is a plan of the saw blade and teeth; and Fig. 3 is a vertical transverse section on line $y\ y$, Fig. 1.

Similar letters of reference indicate corresponding parts.

A in the drawings represents the blade of a circular, straight, or other saw, of any desired size and thickness. The blade A is provided with tooth-shaped abutments $a$, having straight recesses $b$. The parallel edges of the recesses $b$ are beveled so as to form V-shaped tongues that engage the grooved edges of the shanks B' of the insertible saw-teeth B. The shanks B' of the insertible teeth B are slightly curved, so as to exert, when inserted into the straight recesses $b$, a spring action upon the abutments $a$, whereby the rigid locking of the teeth B to the blade A is obtained. The head of the tooth B has an angular projection, $a^2$, at its rear part, that rests against the edge of the abutment $a$, the projecting point of the tooth being laterally enlarged and sharpened, so as to exert the proper cutting action. When it is desired to increase the locking action of the shank B', so as to secure the tooth in a still more reliable manner into the recess $b$ of the abutment $a$, the shank B' is reduced in width at its inner end, as shown at the right-hand side of Fig. 1, and provided at the inner end of the opposite edge of the shank B' with a short heel, $d$, the face of which is not grooved, but made straight. The V-shaped tongue of the recess $b$, that takes into the front edge of the tooth B, is reduced in length, so that the heel can take back of the same when the tooth is driven in, so as to exert thereby a double locking action—first, by the spring of the curved shank, and, secondly, by the spring action imparted by the reduced inner end of the shank and its heel on the recessed abutment $a$. In this manner the teeth are securely retained in the recesses of the blade without being liable to get loose or detached therefrom.

Having thus described my invention, I claim as new and desire to secure by Letters Patent—

1. The combination of a saw-blade having projections or abutments with straight recesses, said recesses having V-shaped edges, with insertible saw-teeth having slightly-curved shanks, the grooved edges of which fit on the V-shaped edges of the recesses, substantially as set forth.

2. The combination of a saw-blade having abutments with straight recesses, said recesses having V-shaped edges, with insertible saw-teeth, the grooved shanks of which are reduced in width and provided with front heels at their inner ends, said heels abutting against the inner ends of the beveled front edges of the recesses, substantially as and for the purpose set forth.

In testimony that I claim the foregoing as my invention I have signed my name in presence of two subscribing witnesses.

WILHELM ARNOLD.

Witnesses:
PAUL GOEPEL,
SIDNEY MANN.